United States Patent [19]

Scharrer et al.

[11] 3,967,167
[45] June 29, 1976

[54] MULTIPLE MINIATURE CAPACITOR
[75] Inventors: Werner Scharrer, Reichenschwand; Fritz Beyer, Lauf, both of Germany
[73] Assignee: Stettner & Co., Lauf, Pegnitz, Germany
[22] Filed: Mar. 14, 1974
[21] Appl. No.: 451,169

[30] Foreign Application Priority Data
Mar. 22, 1973 Germany............................ 2314208

[52] U.S. Cl................................ 317/242; 317/258
[51] Int. Cl.² ....................... H01G 4/12; H01G 4/38
[58] Field of Search............................ 317/242, 258

[56] References Cited
UNITED STATES PATENTS

| | | | |
|---|---|---|---|
| 2,793,333 | 5/1957 | Ehlers.................................. | 317/242 |
| 3,183,419 | 5/1965 | Rieth................................... | 317/242 |
| 3,246,215 | 4/1966 | Rieth................................... | 317/242 |
| 3,676,757 | 7/1972 | Ramisch............................... | 317/242 |
| 3,808,478 | 4/1974 | Winviler............................... | 317/242 |

Primary Examiner—E. A. Goldberg
Attorney, Agent, or Firm—Flynn and Frishauf

[57] ABSTRACT

A ceramic structural body is formed with a plurality of adjacently located integrally connected ceramic thin wall tubes. The outer surfaces of the tubes are metallized to form one electrode of the capacitor, the inner surfaces of the tubes also being metallized to form the other electrode of the capacitor. Connection means are connected to the outer surfaces of at least one of the tubes and to the inner surface of at least one of the tubes; the inner and outer surfaces of the tubes may be sub-divided, and electrically isolated from each other by portions of the underlying ceramic material, or may be continuous, to form a continuous electrode.

11 Claims, 15 Drawing Figures

U.S. Patent  June 29, 1976  3,967,167
FIG.1
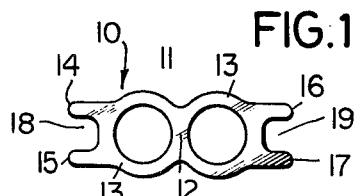
FIG.2
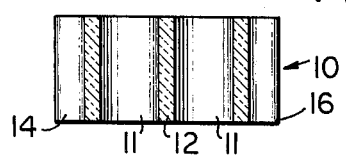
FIG.3
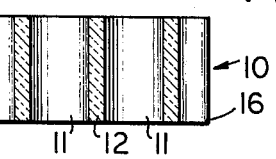
FIG.4
FIG.5
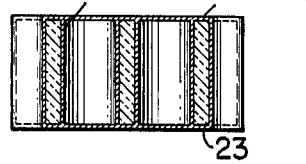
FIG.6
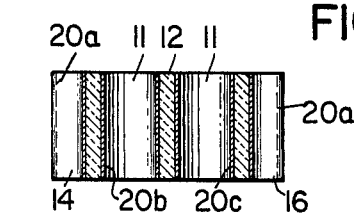
FIG.7
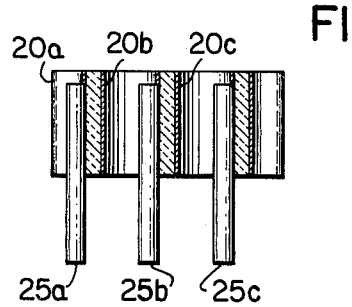
FIG.8
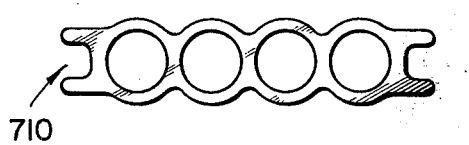
FIG.9
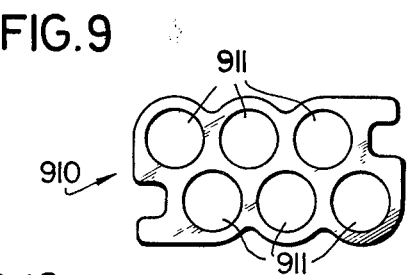
FIG.10
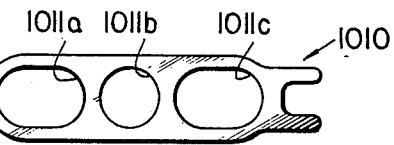
FIG.11
FIG.14
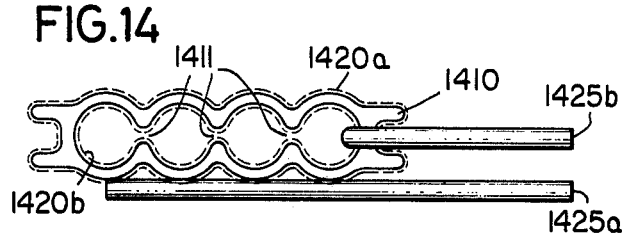
FIG.15
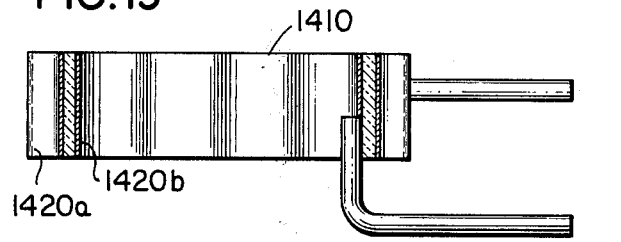
FIG.12
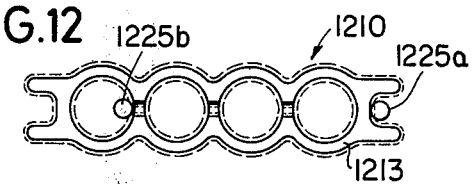
FIG.13
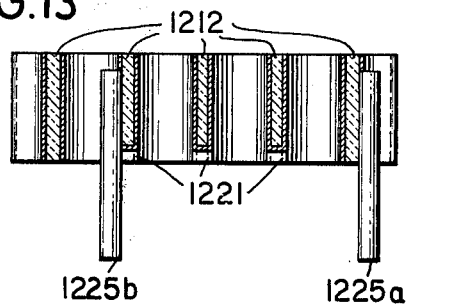

MULTIPLE MINIATURE CAPACITOR

Cross reference to related Patent: 3,808,478, Winkler, filed July 30, 1973 assigned to the assignee of the present application.

The present invention relates to a miniature ceramic capacitor, and more particularly to a miniature ceramic capacitor structure based on ceramic tubes, in which metal electrodes are formed on the inner and outer surfaces of the tubes, to which electrode connections leads or wires may be applied.

Tubular ceramic capacitors have previously been proposed. Even though the wall thickness of the ceramic tubes may be small, the entire structure is mechanically strong, and much stronger than comparable plate or disk-like ceramic capacitors in which the ceramic material is of comparable thickness. The tubular capacitors are highly resistant against breakage.

To miniaturize tubular capacitors while retaining the advantage of the high capacity value, various shapes of hollow, tubular bodies have been proposed. Thus, (see German Pat. No. 688,417) thin wall hollow bodies having circular, spiral or star-shaped cross section have been disclosed. These ceramic bodies are made by extrusion, but require extensive manufacturing steps and working during their production. Each one of the separate tubular capacitors had to be separately extruded, under pressure, and the combination of the separate extrusions into an array, or a battery of capacitors is then obtained by capping the individual tubes and assembling them together.

Tubular capacitors in which the tubes are flattened have also been proposed. The narrow edges of these flattened tubes are formed with grooves in which external electrodes may be located, see, for example, U.S. Pat. No. 3,676,757 (to which German GM 7,101,847 corresponds). These are separate single capacitors in which the capacity is determined by the size of the area covered by metal, as well as by the thickness of the dielectric.

It is sometimes necessary in electronic apparatus to install a plurality of capacitors in predetermined locations, for example in a shielding wall. Connection of the associated components then is a substantial cost factor in the manufacture of the entire high-frequency apparatus or device. It has, therefore, been proposed to utilize entire batteries, or assemblies, or arrays of capacitors in which connection can be made with a printed circuit in one single operating step by dip-soldering. The entire capacitor assembly is connected to the printed circuit board by means of a support block, or a carrier plate, tight with respect to high frequency, in the shielded housing. Various types of multiple capacitors with a common socket have been proposed (see German Disclosure document DT-OS 1,439,298), in which the two coatings or electrodes are, respectively, connected with a feed-through conductor and the metallic housing of the shielding structure. Ceramic tubes have been used as the dielectric, which are silvered at the inside and the outside, the inner silver coating being soldered to the feed-through conductor. This results in high labor content in assembly and manufacture. The ceramic tubes must be held within bores of a strip, or the like, for example by adhesives secured into the bores. The ceramic tube is then secured into a metal cap, or sleeve screwed in the capacitor block, or small metal plates are used to provide contacts to the capacitor electrodes, Insulating plates, or sleeves must then be used to insulate the feed-through conductor from the shielded structure.

U.S. Application Ser. No. 383,531, now U.S. Pat. No. 3,808,478, assigned to the assignee of the present invention, discloses a multiple feed-through capacitor in which ceramic, dielectric bodies are made in the form of a common socket. A suitable manufacturing process is dry-pressing. The pressed, or molded base body is then fired and thereafter coated with an electrode cover. The dry-pressing method of making such feed-through capacitors is, however, a limitation on the shape and type of capacitor which can be made since this manufacturing process cannot be freely used with many varied shapes which, otherwise, would be useful and desirable for capacitors.

It is not possible to make batteries or assemblies of capacitors, such as block capacitors from multiple apertured tubes which have been made of coarse ceramics, and as well known in structural ceramic technology. Cylindrical, rectangular or plate-like extrusions are apertured, longitudinally, by a plurality of continuous ducts or channels, the entire structure being essentially cylindrical. The wall thickness of the individual tubes, assuming the structural, coarse ceramic, would be much too great in order to permit use of such raw material for electrical capacitors, particularly in order to satisfy the requirement for high capacity in small space.

It is an object of the present invention to provide electric ceramic multiple tubular capacitors of high capacity and tiny, or miniature size, which are so constructed that subsequent assembly and connection work are greatly simplified, and suitable for mass production and essentially automatic insertion.

Subject matter of the present invention: Briefly, a pressure extrusion method is used to provide thin-walled tubes having common separating walls, and a common outer electrode. The extrusion unites these tubes to a plate or block-shaped structure, the tubes having at their inside separate, or interconnected inner electrodes. Multiple aperture tubes can thus easily be made, in which the separating walls are thin, and in which the common wall portions of adjacent tubes are limited to only a small percentage of the overall surface of the inner tubes. The arrangement of the inner tubes in such a block can be so selected that, for example, two to ten tubes are continuously located adjacent each other, or are assembled in any other adjacently located configuration.

Automatic mass production of multiple capacitors, particularly tiny, miniature capacitors of this type is obtained by metallizing the inner and outer surfaces of the tubes in one step, and then forming the separate capacitors by grinding off the metal from the end facing surfaces, to separate the inner surfaces into one, or a plurality of capacitor electrodes, facing a common outer electrode. Grinding off an overall metal coating thus separates the previous interconnecting metal coating into two or more groups of electrode coatings at both sides of the tubular walls, so that, in a simple manufacturing step, separate capacitors with a common outer electrode are obtained. If desired, the inner electrodes can be interconnected, for example by forming cuts, or transverse openings between the separating walls of the inner tubes so that, during the grinding step, the coating will not be removed from the region of the cut or opening, since it is not exposed to a grinding wheel. Thus, a single capacitor of high capacity value can be made. The extrusion is preferably so arranged that the outer tubes are formed with projections, between which grooves are defined, to form locating projections for terminals to be connected to the outer electrode.

The invention will be described by way of example with reference to the accompanying drawings, wherein:

FIGS. 1 and 3 are top views and FIGS. 2, 4, 5 and 6 longitudinal sections of a multiple capacitor in various stages of manufacture;

FIGS. 7 to 11 are top views of different embodiments of multiple tubular capacitors;

FIGS. 12 and 14 are top views of two different embodiments of capacitors having different connection arrangements; and FIGS. 13 and 15 are, respectively, longitudinal sections of the capacitors of FIGS. 12 and 14.

Embodiment of FIGS. 1-6: A pressure extruded ceramic multiple-opening tubular body 10 is extruded to have two or more tubular openings 11, separated by a separating wall 12, and surrounded by outer surrounding walls 13. The end portions of the body 10 are formed with projections forming ridges 14, 15, 16, 17. Locating grooves 18, 19 are defined by the space between the ridges 14, 15 and 16, 17, respectively. These ridges have walls which are of thickness similar to that of the tubes 11; they may be oppositely located. Providing ridges 14, 15 and 16, 17, respectively, at both sides of the element, has the advantage that it is not necessary to orient the capacitor with respect to a particular direction, if a single outer electrode is to be used. The size can be very small; the diameter of tubes 11 may be in the order of about 1½ to 4 mm.

The ceramic body 10 (FIGS. 1, 2) is fired and then coated overall by means of a metallic coating 20, shown in FIGS. 3 and 4 schematically in dashed lines. Coating may, for example, be by a chemical metallizing, which is thereafter reinforced by dip-soldering. The coating extends along the longitudinal surfaces, inside the openings 11 as well as around the entire outer circumference, and about the end faces or surfaces 22, 23 of the body. The body is then ground at the end faces to remove the coating from the surfaces 22, 23. After grinding, a coating 20a covering the outer surfaces as well as the grooves 18, 19 will be left, as well as coatings 20b, 20c covering the inside of the openings 11. Terminal wires 25a, 25b, 25c are then connected to the respective coatings 20a, 20b, 20c, to provide a connection for the outer electrode and the two inner electrodes, respectively. All manufacturing steps can be made in mass production processes, essentially entirely automated.

FIGS. 7 to 11 illustrate various possible arrangements; other arrangements may also be used. FIG. 7 shows a serial multiple ceramic body 710, which can be made to provide four separate capacitors with respect to one common outer electrode, similar to the two separate capacitors discussed in connection with FIGS. 1-6. FIG. 8 shows a dual capacitor 810, in which two extruded tubes, after metallizing, are placed next to each other and electrically and mechanically secured together. FIG. 9 shows a single multiple-opening ceramic body 910 which has adjacently located openings 911; body 910 is metallized, similar to the step discussed in connection with FIGS. 3 and 4 and the end faces then ground to remove the metal therefrom. FIG. 10 illustrates an arrangement in which the dimensions, and cross-sectional areas, and the circumferential surfaces of the various tubes 1011a, 1011b, 1011c of the body 1010 are of different size. In the example selected in FIG. 10, the surface area of the openings 1011a and 1011c is the same, but differs from that of the central opening 1011b. Various other combinations of surface areas and shapes may be selected. The body 1110 of FIG. 11 shows an arrangement in which the adjacent portion between adjacent inner tubes, which, in effect, reduces the capacity, is held to a minimum, by forming the tubes in such a manner that their adjacent regions are pointed. Thus, by forming the openings 1111 as polygons, in FIG. 11 shown as hexagons, joined at an apex, the mutual capacity between the individual tubes, all metallized, is reduced to a very low value.

The embodiments so far described provide a group of separate capacitors, each one of which can be connected with suitable electronic components, such as with components forming tuned circuits, for example coils, resistors, or the like. The specific advantage of the structure is that it is not necessary to support a plurality of single tubes, before or after connection into blocks, in an electronic apparatus or device. Thus, the assembly is simplified and thus rendered cheaper. Additionally, subtantial saving in space is obtained, in comparison to the space reqirements of single discrete capacitor elements.

The multiple tubular blocks can be used to make single capacitors of high capacity. The manufacturing steps are, essentially, similar. A tube 1210, as shown in top view in FIG. 12, is formed with an outer wall 1213, and separating walls 1212 between the individual tube sections. Contrary to the construction illustrated in connection with FIGS. 1-6, however, the separating wall 1212 is slightly shorter than the outer walls 13, as seen at the bottom of FIG. 13. Upon metallizing and subsequent grinding of the end faces, a metal coating 1221 will remain at the four shortened sides of the separating walls, to form a connection between the various tubes. Terminal conductors 1225a, 1225b are then connected to the outside coating, and to one of the inside tubes, to connect with the inside coating, respectively. Only a single terminal to the inner electrodes is necessary. For ease of further assembly in electronic equipments or components, it is preferred to space the connections 1225a, 1225b to connect to the tube farthest from the end to which the outer connection 1225 is made. FIGS. 14, 15 illustrate a ceramic body 1410, in which the tubes forming the body are laterally open, that is, the separating walls are entirely broken through, as illustrated at 1411. The connection leads 1425a, 1425b are connected, respectively, to the inner and outer coatings 1420a, 1420b, respectively.

Various changes and modifications may be made within the scope of the inventive concept, and features described in connection with any one of the embodiments may be used with any of the others within the scope of the present invention. The shapes of the tubes, the cross-sectional areas, and the geometric arrangements may be selected, as desired, and projections on the tubes, inwardly or outwardly (preferably outwardly) may be placed where desired, to facilitate automatic insertion by means of automatic insertion apparatus, or to connect or to engage with locating pins in the electronic apparatus, or the insertion devices therefor.

We claim:
1. Monolithic, single structure integral miniature capacitor structure comprising a ceramic extruded multi-tubular structural body formed of at least three adjacently located elongated ceramic thin-walled tubes each having a diameter in the order of 1-1/2 to 4 mm. and being of essentially circular cross section, extending parallel, and located next to each other and having common contiguous tangential side wall portions to form an essentially aligned, integrally connected multi-tubular structure;

a first metallization layer located on the outer surfaces of said connected tubes to form a first continuous electrode;

further metallization layers formed on the inner surfaces of said tubes, the metallization of the inner metallized surfaces of said tubes being electrically continuous so that the interior of the tubes are connected electrically by said metallization, to form a second continuous electrode;

and connection means connected, respectively, to the first metallization layer on the outer surface of the tubes and to the further metallization layer on the inner surfaces of said tubes.

2. Capacitor according to claim 1, wherein the separating walls of the tubes between adjacent tubes are formed with openings axially inwardly from the end faces thereof, said openings being metallized to connect adjacent tubes by said metallization.

3. Capacitor according to claim 1, wherein the surface area of respective adjacent tubes is different.

4. Monolithic, single structure integral miniature cpacitor structure comprising a ceramic extruded multi-tubular structural body formed of at least three adjacently located, elongated ceramic thin-walled tubes, each having a cross-section falling within an outline of about 1½ to 4 mm., and being of polygonal shape, said tubes extending parallel to each other and being located next to each other, and have common contiguous side wall portions to form an essentially aligned, integrally connected multi-tubular structure;

a first metallization layer located on the outer surfaces of said connected tubes to form a first continuous electrode;

further metallization layers formed on the inner surfaces of said tubes;

and connection means connected to the first metallization layer on the outer surface of the tubes and to the further metallization layers.

5. Miniature capacitor structure according to claim 4, wherein the polygonal structure is a hexagonal structure.

6. Miniature capacitor structure according to claim 4, wherein the inner metallized surfaces of said tubes are electrically separate and the connection means include the plurality of terminal means, one each connected to a further metallization layer on one each of the inner surfaces of the tubes.

7. Miniature capacitor structure according to claim 4, wherein the metallization of the inner metallized surfaces of said tubes is electrically continuous so that the interior of the tubes are connected electrically by said metallization, and the connection means includes a single terminal means connected to the further metallization.

8. Capacitor according to claim 4, wherein adjacent tubes are connected at the corners of the polygonal structure.

9. Monolithic, single structure integral miniature capacitor structure comprising a ceramic extruded essentially structural body formed of at least three adjacently located elongated ceramic thin-walled essentially tubular elements, each having a diameter in the order of 1½ to 4 mm. and being of essentially circular cross section, extending parallel, and located next to each other, the tubes being laterally open, and having common contiguous side wall portions to form an essentially aligned, integrally connected essentially multi-tubular structure with a common, continuous inner wall surface;

the first metallization layer located on the outer surfaces of said connected tubular elements to form a first continuous electrode;

a further metallization layer formed on the continuous inner wall surface of said connected tubular elements to form a second electrode, or electrodes;

and connection means connected respectively to the first metallization layer and to the further metallization layer.

10. Capacitor according to claim 9, wherein said body is formed with at least one lateral projecting ridge having a wall thickness of the order of the wall thickness of the tubular elements and extending from the outside of the body opposite to, and in alignment with an adjacent tubular element and forming a groove between the projection and the remainder of the body, the connection means being electrically and mechanically secured in the groove.

11. Monolithic single structure integral miniature capacitor structure comprising a ceramic extruded multi-tubular structural body formed of a plurality of adjacently located elongated ceramic thin-walled tubes having a diameter in the order of 1½ to 4 mm., and of essentially similar cross sections located next to each other, having common side wall portions to form an integrally connected multi-tubular structure;

a first metallization layer located on the outer surfaces of said connected tubes to form one continuous electrode;

further metallization layers formed on the inner surfaces of said tubes;

at least one lateral projecting ridge extending from the outside of the end tubes of said plurality of said aligned tubes of the structure said ridge having a wall thickness in the order of the wall thickness of the end tubes and defining a groove between the ridge and the remainder of the structure;

first connection means electrically and mechanically secured in the groove and forming a connection to the first metallization layer on the outer surface of said tubes;

and second connection means connected to the further metallization layers.

* * * * *